(12) United States Patent
Eguchi

(10) Patent No.: US 6,499,785 B2
(45) Date of Patent: Dec. 31, 2002

(54) STORAGE DEVICE

(75) Inventor: Tomoo Eguchi, Inagi (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/946,521

(22) Filed: Sep. 6, 2001

(65) Prior Publication Data

US 2002/0030375 A1 Mar. 14, 2002

(30) Foreign Application Priority Data

Sep. 11, 2000 (JP) ........................................ 2000-274514

(51) Int. Cl.$^7$ .............................. B60R 7/04; E06B 9/15; B65D 43/20
(52) U.S. Cl. ...................... 296/37.8; 160/201; 224/539; 220/350; 312/217
(58) Field of Search ................................. 296/37.1, 37.8, 296/24.1; 224/539; 220/349.2, 350, 351, 345.4, 345.3; 312/297; 160/201; 108/44, 45

(56) References Cited

U.S. PATENT DOCUMENTS

| 1,955,835 A | * | 4/1934 | Samstag | 220/350 |
| 2,000,162 A | * | 5/1935 | Buscham | 220/350 |
| 2,099,122 A | * | 11/1937 | Kreisler | 220/350 |
| 2,107,997 A | * | 2/1938 | Horsley | 312/297 |
| 2,805,910 A | * | 9/1957 | Townsend | 312/297 |
| 3,460,878 A | * | 8/1969 | Peterson et al. | 312/297 |
| 4,061,227 A | * | 12/1977 | Olbres | 312/297 |
| 4,413,489 A | * | 11/1983 | Hogue | 312/297 |
| 4,717,196 A | * | 1/1988 | Adams | 296/98 |
| 4,795,206 A | * | 1/1989 | Adams | 296/98 |
| 4,854,632 A | * | 8/1989 | Kreuze et al. | 296/37.8 |
| 6,168,059 B1 | * | 1/2001 | Salenbauch et al. | 224/539 |
| 2002/0005424 A1 | * | 1/2002 | Lange et al. | 224/539 |

FOREIGN PATENT DOCUMENTS

| DE | 40 10 241 | 4/1991 |
| JP | 8-192685 | 7/1996 |

* cited by examiner

Primary Examiner—D. Glenn Dayoan
Assistant Examiner—H. Gutman
(74) Attorney, Agent, or Firm—Kanesaka & Takeuchi

(57) ABSTRACT

A storage device is provided with a sliding lid slidably contacting guide rails formed at both side ends of an opening of the storage device, and when the sliding lid is stored in an accommodating section formed continuously to a rear end of the opening, the sliding lid opens at the storage device. In the storage device, in sliding sections where the guide rails and sliding lid slidably contact each other, there are formed buffer sections for allowing the sliding lid to be displaced toward a direction orthogonal to a sliding direction. Therefore, the buffer sections are deformed during the opening and covering movements, so a play can be eliminated.

6 Claims, 3 Drawing Sheets

STORAGE DEVICE

BACKGROUND OF THE INVENTION AND RELATED ART STATEMENT

The present invention relates to a storage device in which an opening is covered by a sliding lid.

For example, as a lid for covering an opening of a storage device disposed in a center console of an automobile, there has been known a lid, in which a number of projected bars are provided in parallel on a soft and thin sheet member to thereby form the lid slidably engaging a pair of right and left guide rails. According to this lid, since the lid can be freely bent at thin-wall portions respectively provided between the projection bars adjacent to each other, when the storage device is opened, the lid is stored like a shutter in an accommodating section provided continuously to a rear end of an opening, and when the storage device is covered, the lid extends along the guide rails to cover the opening. A weight applied on an upper surface of the lid is supported by rigidity of the projected bars.

In the sliding lid described above, the projected bars are provided for securing the rigidity such that the sliding lid is not deformed even if weight is applied on the lid in a condition of covering the opening. In order to prevent the lid from disengaging from the guide rails, it is necessary to engage extended portions of the projected bars with the guide rails. Since the projected bars are formed of hard materials, in order to secure stability in movement at the time of opening and covering operations as well as to reduce a sliding sound or noise, it is necessary to additionally provide a countermeasure therefor. Also, since the thin-wall portions are required to be formed of soft materials, it is necessary to use, for example, two-material molding, insert molding or the like. These points extremely increase a manufacturing cost.

The present invention has been made to solve the foregoing problem in the conventional device, and a main object of the invention is to provide a storage device including a sliding lid having a low sliding sound and stability in the movement, in which the sliding lid is prevented from disengaging even if an article is placed on the sliding lid, while the sliding lid can be manufactured at a relatively low cost.

Further objects and advantages of the invention will be apparent from the following description of the invention.

SUMMARY OF THE INVENTION

To achieve the aforementioned object, a first aspect of the invention provides a storage device, which comprises a sliding lid slidably engaging guide rails formed at both sides of an opening, in which the sliding lid is stored in an accommodating section formed continuously to a rear end of the opening to thereby open the opening; and buffer sections formed at least one of sliding sections where the guide rails and the sliding lid slidably contact with each other. The buffer sections allow the sliding lid to be displaced toward a direction orthogonal to a sliding direction. Accordingly, since the buffer sections are deformed during the opening and covering movements, the sliding sound can be reduced, and a play can be eliminated.

Also, according to a second aspect of the invention, the buffer sections are formed at both side ends of the sliding lid, and projections or ribs for preventing the buffer sections from disengaging are formed at the guide rails. Accordingly, even if the sliding lid is bent due to the application of weight thereto, the buffer sections engage the ribs, so that the lid can be prevented from disengaging from the guide rails.

Further, according to a third aspect of the invention, the sliding lid is formed of elongate thick-wall sections and thin-wall sections, which are arranged alternately, and the buffer sections are provided at both ends of the thick-walled sections. According to a fourth aspect of the invention, the thick-wall sections are respectively provided with ribs for increasing weight in a vertical direction. Accordingly, the entire sliding lid can be formed of a soft material only.

DETAILED DESCRIPTION OF PREFERRED EMBODIMENT

Hereunder, an embodiment of the present invention will be explained with reference to the accompanied drawings.

Figure 1:
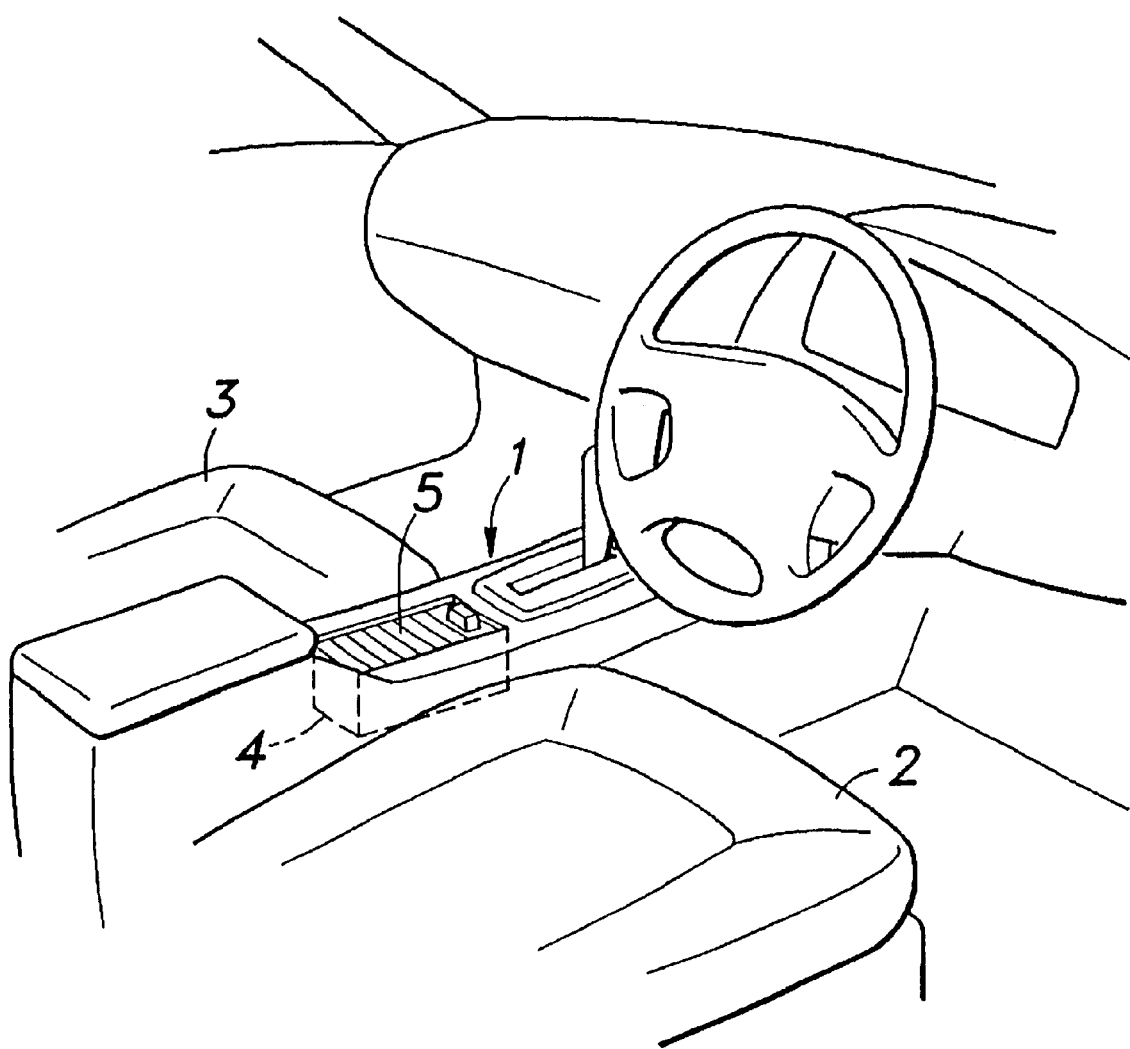
FIG. 1 is a perspective view of a main section of an interior of a passenger car, to which the present invention is applied.

FIG. 1 shows a center console box 1, to which a storage device of the present invention is applied. The center console box 1 is provided between a driver's seat 2 of an automobile and a front passenger's seat 3, and a box member 4 having an open upper surface is embedded inside the center console box 1. An opening section of the box member 4 can be normally covered by a sliding lid 5 which can be freely opened and covered.

Figure 2:
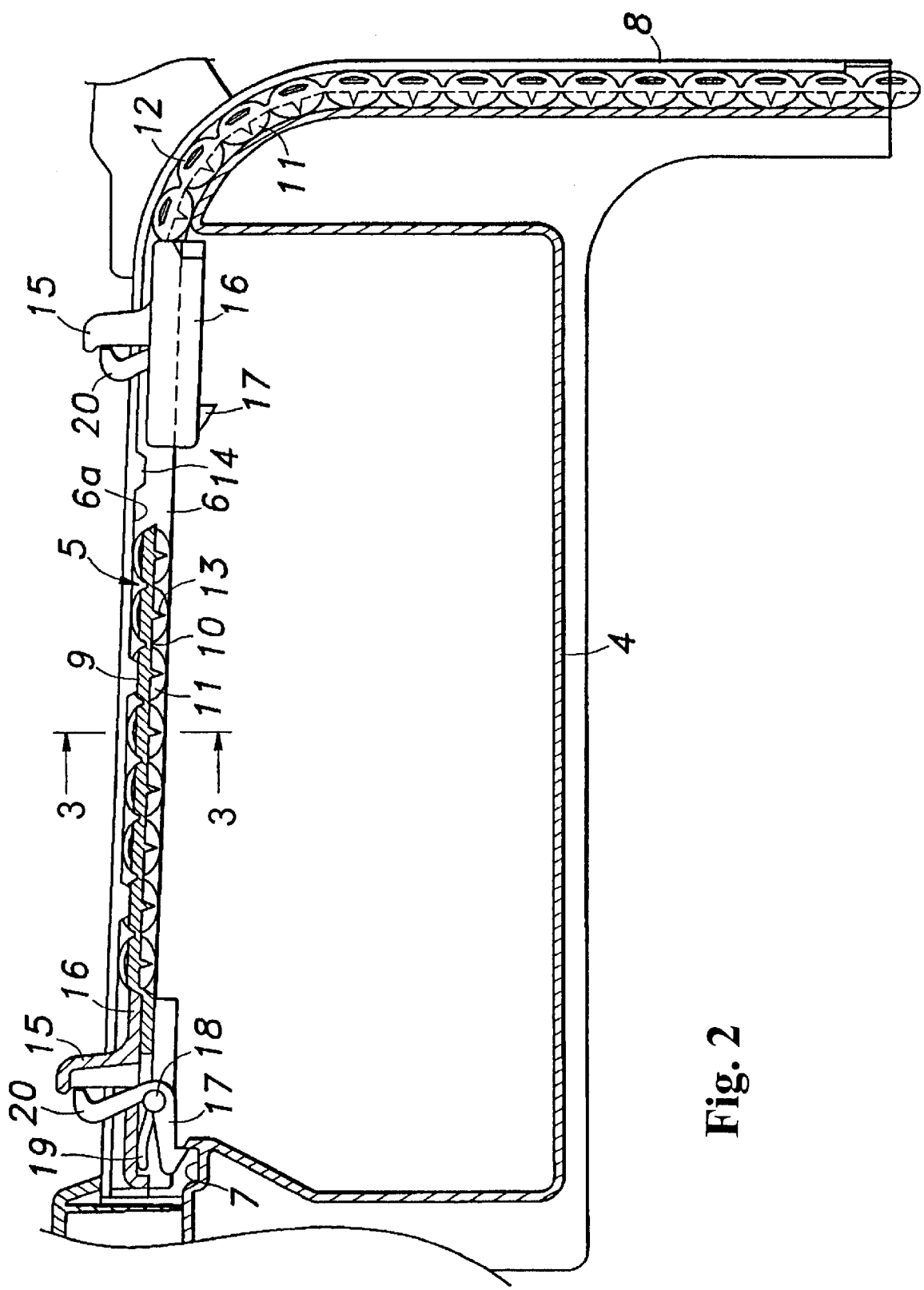
FIG. 2 is a vertical cross sectional view along front and rear directions of a storage device according to the present invention.

As shown in FIG. 2, guide rails 6 in which the sliding lid 5 is slidably moved are formed at both side portions of the opening section of the box member 4. At a front end of the opening section, there is formed a dent 7 which is engaged with a lock claw, described later, for maintaining a closed state of the sliding lid 5. Also, at a rear end of the opening section, there is formed an accommodating section 8 which accommodates the sliding lid 5 by suspending the same therein at the time of opening the sliding lid 5.

The guide rails 6 and the accommodating section 8 are connected to each other with a circular arc having an adequate curvature, and the sliding lid 5 which extends horizontally at the time of covering is smoothly dropped into the accommodating section 8 when the sliding lid 5 is opened.

The sliding lid 5 has a shape like a shutter, in which a number of elongated thick-wall sections 9 are connected to each other by thin-wall sections 10, and the entire sliding lid 5 is formed of a soft synthetic resin material. Sliding sections 11, which are formed at both side ends of each thick-wall section 10, slidably contact the guide rails 6 formed in the box member 4.

Each sliding section 11 of the slide lid 5, which slidably contacts the guide rail 6, has an elliptical shape in section. At an abutting portion of each sliding section 11, which abuts against a lower surface of an upper rail 6a, there is formed a buffer section 12 in which a part of a thickness portion is removed so that the buffer section can be made elastically deformable in a direction orthogonal to a front surface of the sliding lid 5.

On a lower surface of a central portion in front and rear directions of the thick-wall section 9, a rib 13 connected to the sliding sections 11 at both sides projects throughout the entire width direction. Accordingly, a modulus of longitudinal elasticity of the thick-walled section 9 is increased to thereby reduce a bending deformation of the sliding lid 5 in case weight is applied to the upper surface of the sliding lid 5.

Figure 3:
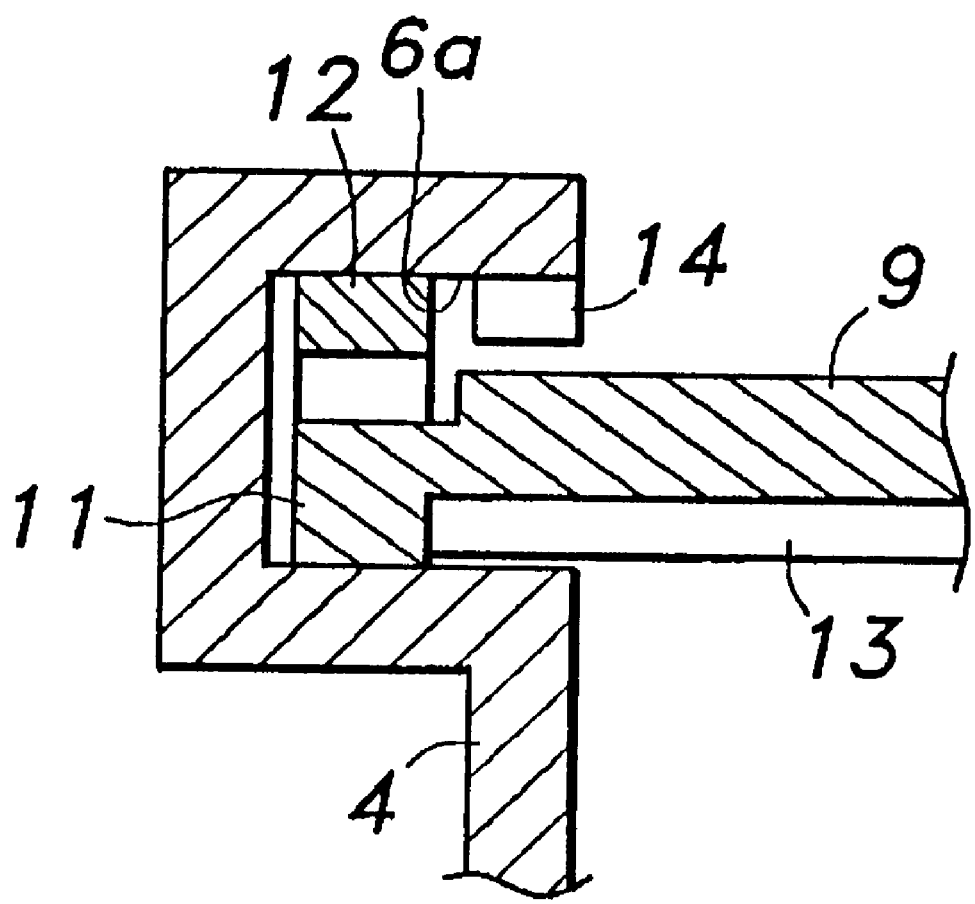
FIG. 3 is an enlarged partial cross sectional view taken along line 3—3 in FIG. 2.

On the other hand, ribs 14 project downwardly at main points of the guide rails 6, and the ribs 14 engage the buffer sections 12 formed in the upper sides of the sliding sections 11 (refer to FIG. 3) in case weight is applied to the upper surface of the sliding lid 5. Therefore, even if the thick-walled sections 9 are bent, the sliding lid 5 is prevented from disengaging from the guide rails 6.

The forward end of the sliding lid 5 is connected to a tab member 15 where fingertips are held or hooked at the time of opening and covering operations. Then, in a base 16 of the tab member 15, a lock claw 17, which is engaged with the dent 7 formed at the front end of the opening section of the box member 4 to thereby hold the covering state of the sliding lid 5, is supported freely rotatably by a shaft 18 extending in the width direction.

The lock claw 17 is formed of a hard synthetic resin material, and an elastic piece 19, which abuts against an inner surface of the base 16 of the tab member 15, is integrally formed with the lock claw 17 such that the elastic piece 19 constantly urges the claw 17 elastically in a direction of engaging the dent 7. Accordingly, when the sliding lid 5 is advanced fully by holding the tab member 15, the lock claw 17 is automatically engaged with the dent 7, so that the sliding lid 5 is prevented from opening. Then, when the sliding lid 5 is opened, a finger is hooked at a finger hook 20, which extends upwardly from a portion of a supporting shaft 18 of the lock claw 17, and the sliding lid 5 is pulled rearwardly, so that the lock claw 17 is disengaged from the dent 7.

Although the present invention has been explained by exemplifying the case in which the present invention is applied to the console box of the automobile in the aforementioned embodiment, the present invention is not limited thereto, and can be applied to furniture or office equipments.

As described above, according to the present invention, since the buffer sections formed at both side ends of the sliding lid abut against the guide rails while having elasticity, the sliding sound at the time of opening and covering operations is reduced, and the stability in the opening and covering movements can be increased. Furthermore, in case the sliding lid is bent, the ribs formed at the main points of the guide rails are hooked with the buffer sections, so that the lid is prevented from dropping. According to the aforementioned structure, since the sliding lid can be integrally formed of a relatively soft and single material, there can be achieved an effect of lowering the manufacturing cost.

While the invention has been explained with reference to the specific embodiments of the invention, the explanation is illustrative and the invention is limited only by the appended claims.

What is claimed is:

1. A storage device, comprising:
    a housing member having an opening and an accommodating section extending continuously to one end of the opening,
    guide rails formed in the housing member at two opposing sides of the opening,
    a sliding lid slidably engaging the guide rails, said sliding lid being stored in the accommodating section when the opening is uncovered, and
    a plurality of buffer sections forming at least one sliding section where the guide rails and the sliding lid slidably contact each other, said buffer sections allowing the sliding lid to be displaced toward a direction orthogonal to a sliding direction.

2. A storage device according to claim 1, wherein said buffer sections are formed at two sides of the sliding lid contacting the guide rails, said guide rails having projections for preventing the buffer sections from disengaging therefrom.

3. A storage device according to claim 1, wherein said sliding lid is formed of elongated thick-wall sections and thin-wall sections arranged alternately, said buffer sections being provided at two ends of each of said thick-wall sections.

4. A storage device according to claim 3, wherein said thick-wall sections are respectively provided with ribs for increasing strength in a vertical direction.

5. A storage device according to claim 3, wherein each of said thick-wall sections includes enlarged sliding members at the two ends engaging the guide rails, each of the sliding members having a space therein for forming the buffer section.

6. A storage device according to claim 5, wherein said sliding lid further includes a tab for sliding the lid, and an engaging member situated near the tab for engaging a dent of the housing member when the sliding lid is covered.

* * * * *